(12) United States Patent
Hunter (10) Patent No.: US 6,341,794 B1
(45) Date of Patent: Jan. 29, 2002

(54) TRAILER HITCH ALIGNMENT APPARATUS (76) Inventor: Timothy J. Hunter, 965 Kentucky Rd., Princeton, KS (US) 66078

( * ) Notice: Subject to any disclaimer, the term of this patent is extended or adjusted under 35 U.S.C. 154(b) by 0 days.

(21) Appl. No.: 09/704,084

(22) Filed: Nov. 1, 2000

(51) Int. Cl.[7] .......................... B60D 1/01; G01C 21/00; B60Q 11/00
(52) U.S. Cl. ...................... 280/477; 33/264; 116/28 R
(58) Field of Search ........................... 280/477; 33/264; 116/28 R (56) References Cited

U.S. PATENT DOCUMENTS

| | | | |
|---|---|---|---|
| 3,818,599 A | 6/1974 | Tague | |
| 3,889,384 A | 6/1975 | White | |
| 3,918,746 A | 11/1975 | Lehtisaari | |
| 4,054,302 A | 10/1977 | Campbell | |
| 4,169,610 A | 10/1979 | Paufler | |
| 4,313,264 A | 2/1982 | Miller, Sr. | |
| 4,708,359 A | 11/1987 | Davenport | |
| 4,961,590 A | * 10/1990 | Davenport | ................. 280/477 |
| 5,113,588 A | 5/1992 | Walston | |
| 5,669,621 A | 9/1997 | Lockwood | |
| 5,970,619 A | 10/1999 | Wells | |
| 6,042,136 A | * 3/2000 | Heinecke | ................. 280/477 |

* cited by examiner

*Primary Examiner*—Brian L. Johnson
*Assistant Examiner*—Matt Luby
(74) *Attorney, Agent, or Firm*—Dale J. Ream (57) ABSTRACT

A trailer hitch alignment apparatus comprises a first guide member removably attached to a vehicle bumper and a second guide member removably attached to a trailer hitch socket. The first guide member includes a magnetic base with a telescopically extensible rod adjustably coupled thereto. The second guide member includes a magnetic base having an upwardly extending telescopic rod and a downwardly extending semi-flexible shaft attached thereto. The shaft extends downwardly through a bore defined by the trailer hitch tongue so as to contact the trailer hitch ball when the ball and socket are aligned. Contact between the shaft and ball causes vertical displacement of the shaft and guide rod. Therefore, the two telescopic guide rods, visible from a driver's seat, facilitates lateral alignment of the ball and socket while vertical displacement of the second rod indicates perfect forward alignment.

17 Claims, 9 Drawing Sheets

TRAILER HITCH ALIGNMENT APPARATUS

BACKGROUND OF THE INVENTION

This invention relates generally to trailer hitch alignment devices and, more particularly, to an alignment apparatus having independent visual indicators relative to lateral and longitudinal alignment of a trailer hitch ball and socket.

Aligning the trailer hitch ball of a towing vehicle with the trailer hitch socket of a trailer for the purpose of coupling them together is a difficult task. In backing a vehicle toward the trailer, there comes a point when the socket of the trailer is no longer visible to the tow vehicle driver. Perfectly aligning the ball and socket is often a multiple trial-and-error procedure.

Various apparatus have been proposed in the art for providing telescopic rods or the like for visually indicating when proper alignment has been achieved. While assumably effective in assisting a driver in obtaining the correct lateral alignment of a ball and socket, these devices do not provide a reliable means of indicating when the perfect longitudinal alignment has also been achieved. Incorrect longitudinal (forward/rearward) alignment may result in a damaging collision between the towing vehicle and trailer.

Therefore, it is desirable to have a trailer hitch alignment apparatus which provides primary and secondary visual indicators relative to lateral and longitudinal alignment of a trailer hitch ball and socket combination.

SUMMARY OF THE INVENTION

A trailer hitch alignment apparatus according to the present invention includes a first guide member removably coupled to a towing vehicle adjacent the trailer hitch ball thereof and a second guide member removably coupled to the trailer hitch socket of a trailer. The first guide member includes a base that may be magnetically adhered to the bumper of a vehicle and includes a telescopically extensible guide rod. The second guide member includes a C-shaped base that may be magnetically coupled to the trailer hitch socket of a trailer. A second telescopically extensible guide rod extends from the base of the second guide member. In addition, a semi-flexible shaft is attached to a lower end of the second guide rod and extends downwardly relative to the base. Preferably, the shaft extends through a bore drilled through the trailer hitch socket. As a towing vehicle is backed toward the trailer during a hitching operation, the shaft is contacted by the trailer hitch ball and is slidably upwardly displaced. Therefore, the two telescopic guide rods are visible to the driver of the towing vehicle for proper lateral (side to side) alignment of the trailer hitch ball and socket. Then, when the ball and socket become longitudinally aligned, the vertical movement of the second guide rod is visible to the driver and indicates that alignment is complete.

Therefore, a general object of this invention is to provide a trailer hitch alignment apparatus for visually assisting a driver in laterally and longitudinally aligning a trailer hitch ball and socket.

Another object of this invention is to provide an alignment apparatus, as aforesaid, which provides a secondary visual indicator when a hitch socket of a trailer is positioned directly atop a hitch ball of a towing vehicle.

Still another object of this invention is to provide an alignment apparatus, as aforesaid, having a pair of telescopic guide rods magnetically attached to the towing vehicle and trailer.

Yet another object of this invention is to provide an alignment apparatus, as aforesaid, in which the secondary visual indicator is a vertical displacement of the second guide rod upon contact with the trailer hitch ball of the towing vehicle.

A further object of this invention is to provide an alignment apparatus, as aforesaid, that is easy and economical to manufacture and use.

A still further object of this invention is to provide an alignment apparatus, as aforesaid, in which the telescopic guide rods are configured and colored for easy viewing by the driver of a towing vehicle.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

A trailer hitch alignment apparatus according to the present invention will now be described with reference to FIGS. 1–9 of the accompanying drawings. One embodiment of the alignment apparatus 20 is particularly shown in FIGS. 1–4 and includes first 22 and second 34 guide members.

Figure 1:
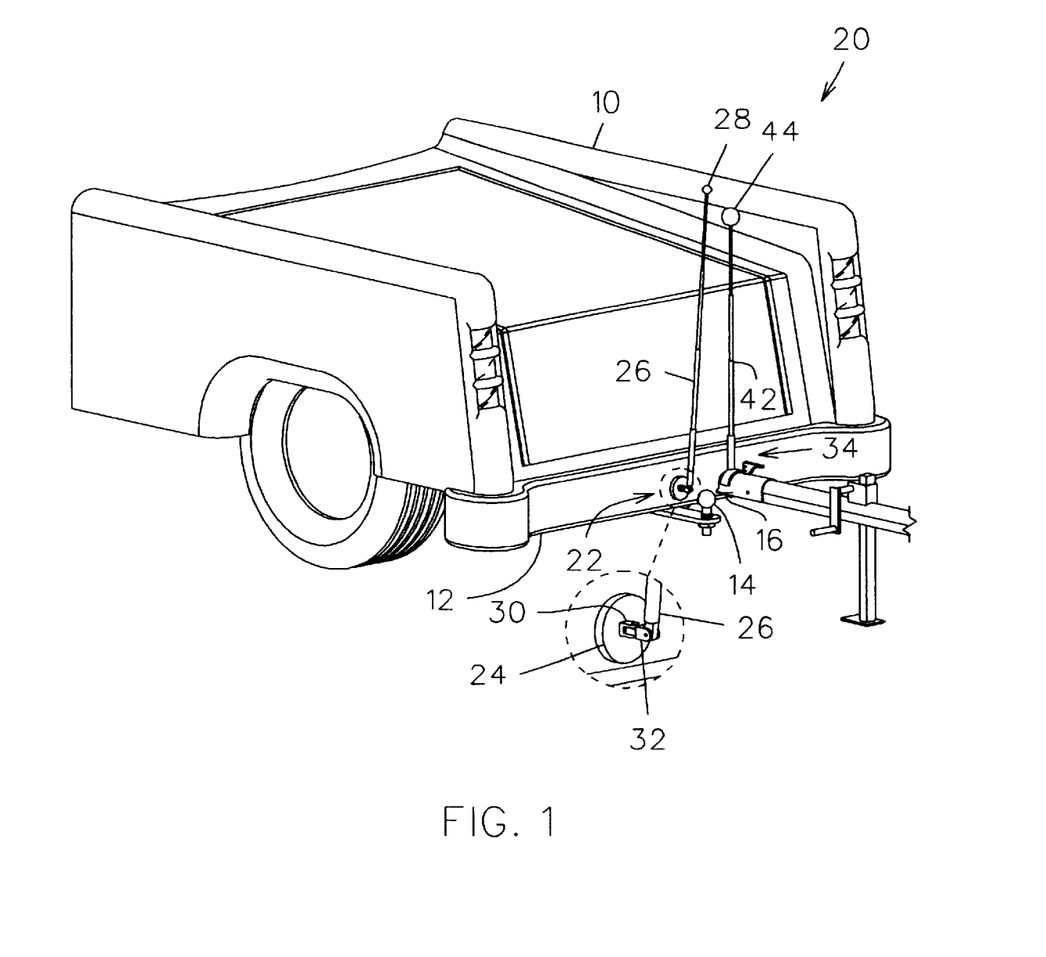
FIG. 1 is a perspective view of a trailer hitch alignment apparatus according to the present invention mounted to a towing vehicle and trailer with an enlarged isolated view of a coupling assembly of a first guide member to a first base.

The first guide member 22 includes a base 24 (hereafter referred to as the "first base") having a circular configuration although other configurations would also work. The first base 24 includes a magnetic surface so that it may be removably attached to the rear bumper 12 of a towing vehicle 10 or any other metallic surface thereon. Preferably, the first base 24 is positioned in longitudinal alignment with a trailer hitch ball 14 extending from the vehicle 10 (FIG. 1). The first guide member 22 further includes a first telescopically extensible guide rod 26 having upper and lower ends. A first guide ball 28 is fixedly attached to the upper end of the first guide rod 26 and is brightly colored for enhanced visibility. A first clevis 30 is fixedly attached to the first base 24. A second clevis 32 includes a flange that is axially coupled to the first clevis 30 such that the second clevis 32 is laterally pivotal relative to the first base 24. The lower end of the first guide rod 26 is axially coupled to the second clevis 32 for pivotal forward or rearward movement thereof relative to the first base 24. Therefore, the first guide rod 26 may be laterally or longitudinally adjusted such that the first guide ball 28 is positioned directly above the trailer hitch ball 14 even if the first base 24 is somewhat displaced therefrom.

Figure 2:
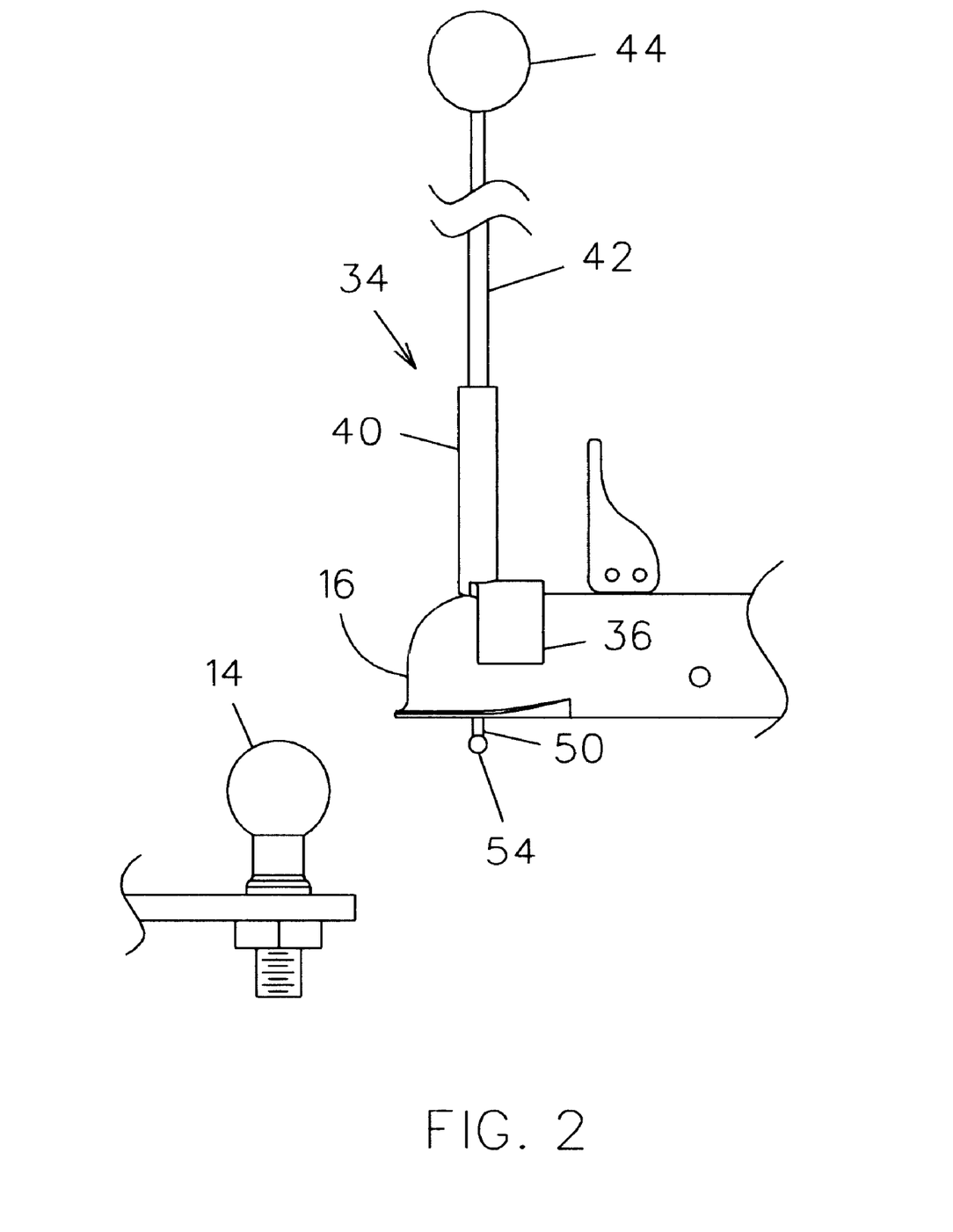
FIG. 2 is a fragmentary side view of the apparatus as in FIG. 1.
Figure 3:
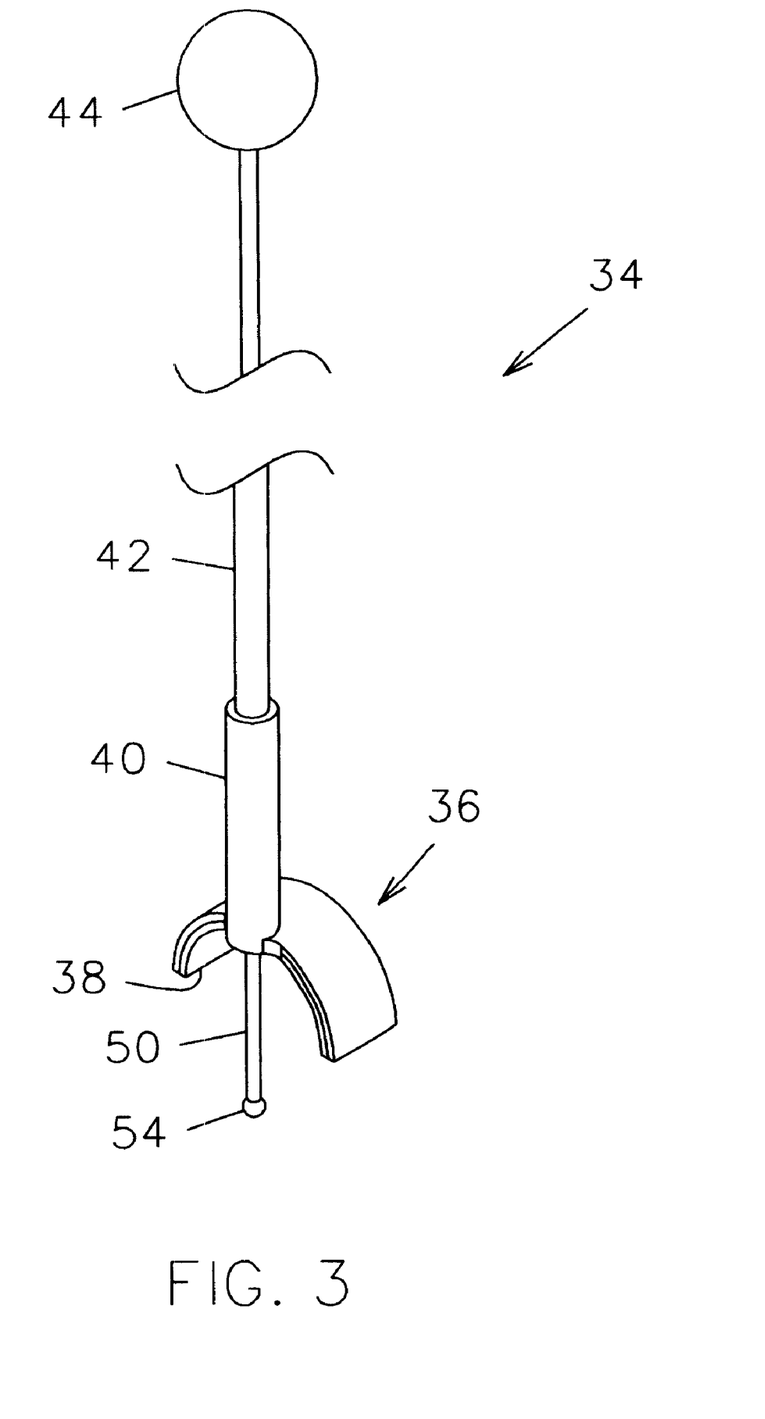
FIG. 3 is a perspective view of the second guide member of the apparatus as in FIG. 1.

The second guide member 34 includes a second base 36 having a C-shaped configuration so as to rest upon the trailer hitch socket 16 of a trailer (FIGS. 1 and 2). The second base 36 also includes a magnetic layer 38 for removably adhering to the hitch socket 16. A tubular housing 40 is fixedly attached to the second base 36 at a lateral edge thereof, the lower end of the housing 40 being coplanar with the magnetic layer 38 of the second base 36. The housing 40 defines substantially open upper and lower ends. A second telescopically extensible guide rod 42 is slidably positioned within the housing 40 and upwardly extensible through the open top. A compression spring 46 is also positioned within the housing and coupled to the second guide rod 42. The spring 46 is compressed as the second guide rod 42 is upwardly displaced and returns to its normally unbiased configuration when the second guide rod 42 is no longer being vertically displaced, as to be more fully described below.

A second guide ball 44 is fixedly attached atop an upper end of the second guide rod 42 and is brightly colored for enhanced visibility. The diameter of the second guide ball 44 is greater than the diameter of the first guide ball 28 for enhanced visibility of a vertical movement of the second guide ball 44, as to be described more fully below.

Figure 4:
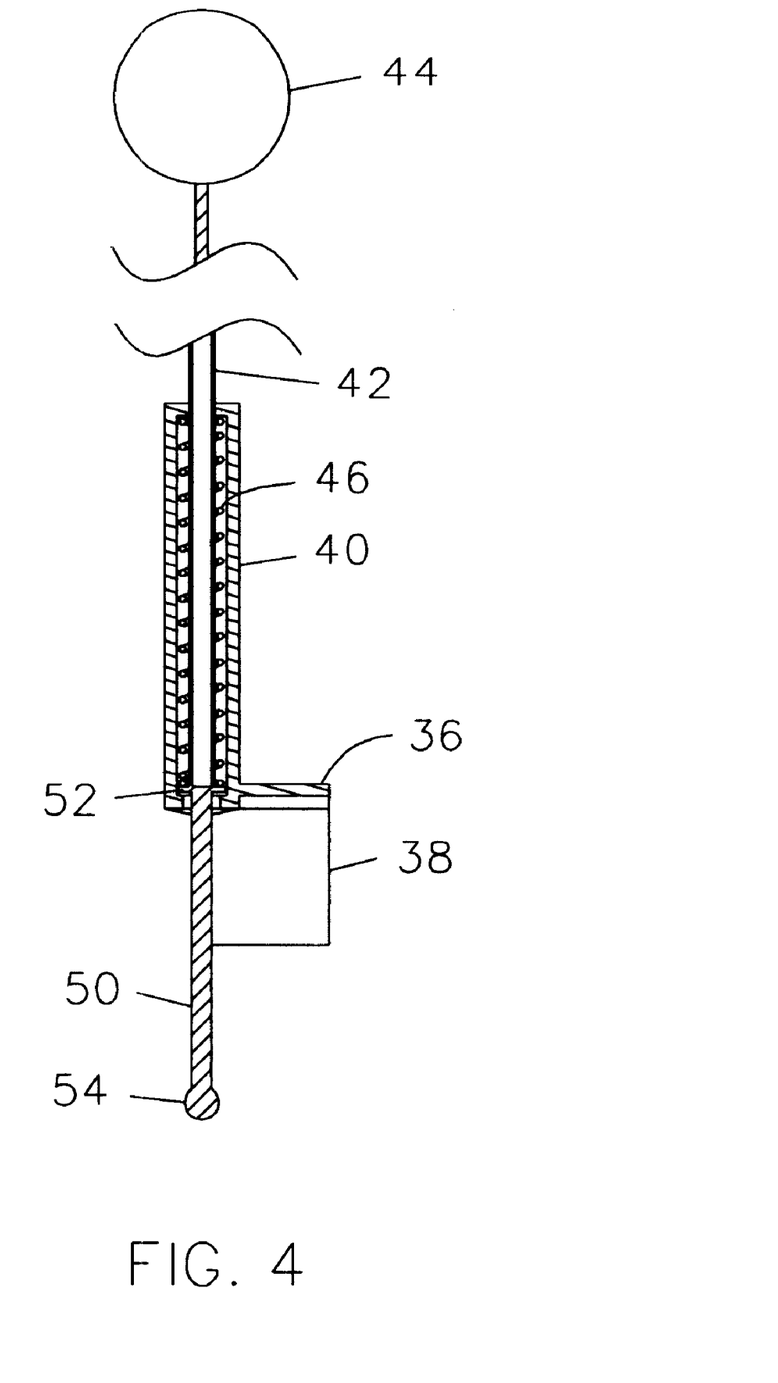
FIG. 4 is a sectional view of the second guide member taken along line 4—4 of FIG. 3.
Figure 5:
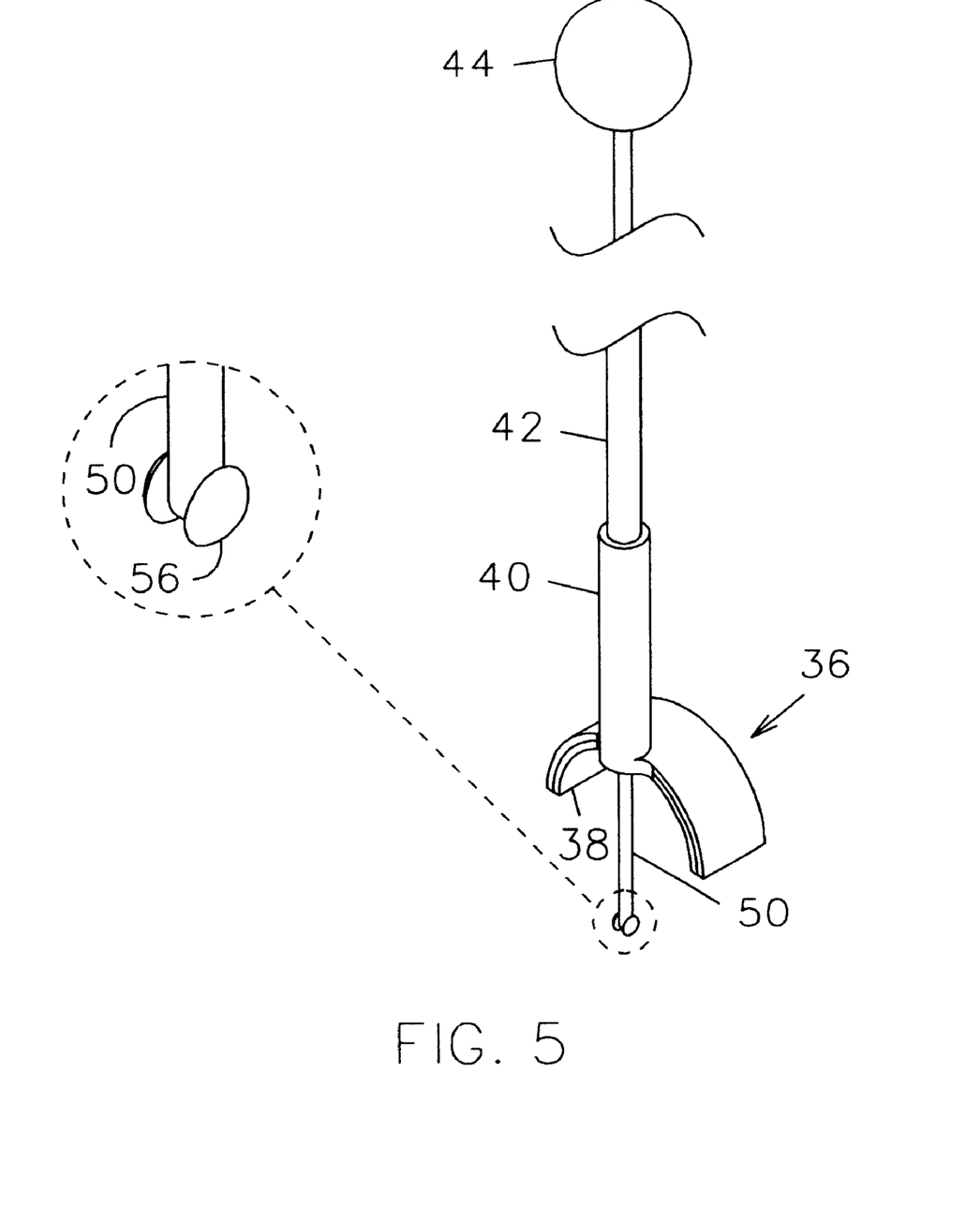
FIG. 5 is a perspective view of another embodiment of the second guide member.
Figure 6:
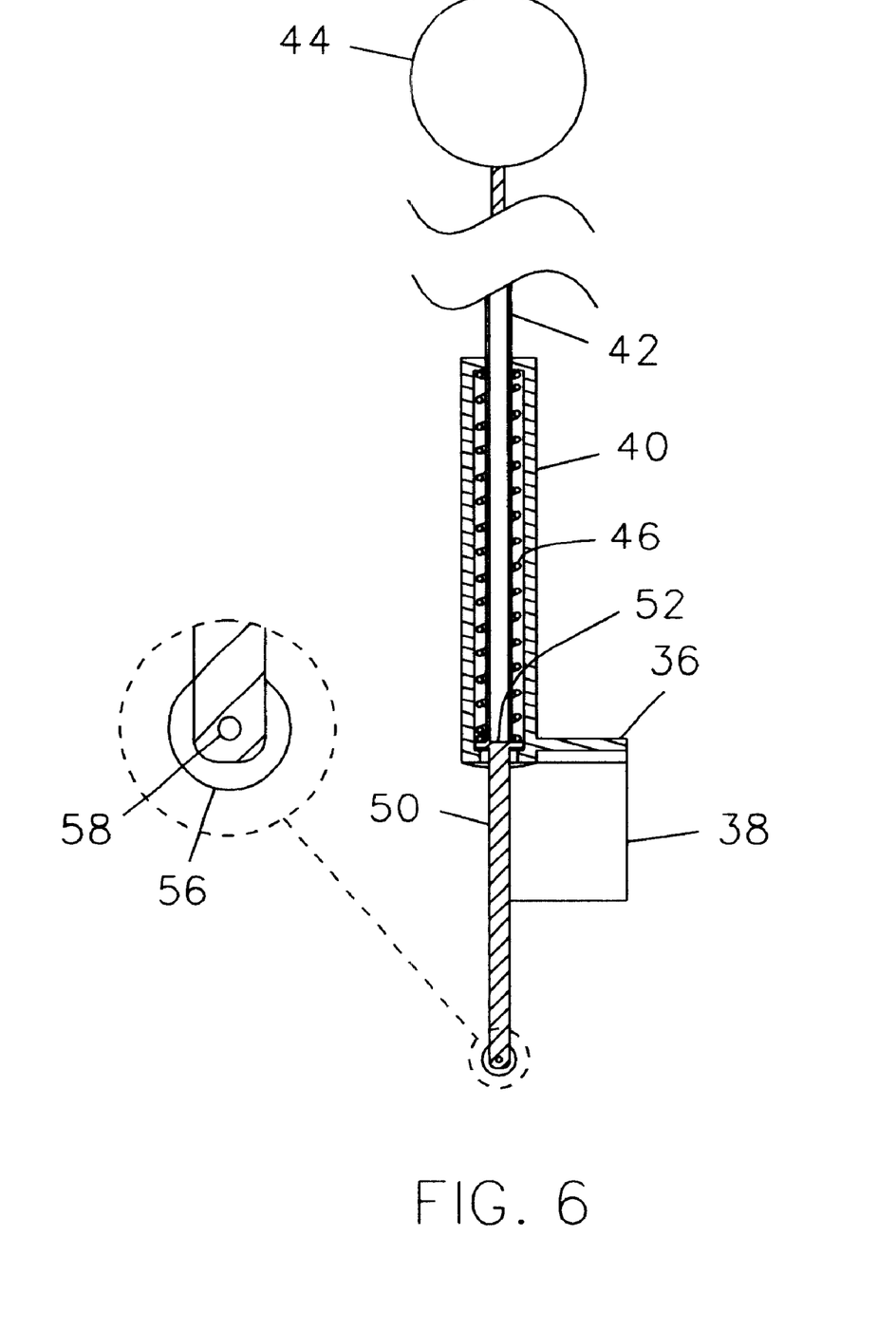
FIG. 6 is a sectional view of the second guide member taken along line 6—6 of FIG. 5.

A semi-flexible shaft 50 of a carbon fiber construction is fixedly attached at one end to a washer 52 which, in turn, is connected to the lower end of the second guide rod 42. In an unbiased configuration, the shaft 50 extends downwardly through the open lower end of the housing 40 with the diameter of the washer 52 preventing the second guide rod 42 from sliding out of the housing 40 through the substantially open lower end (FIG. 4). When the apparatus 20 is positioned upon a trailer hitch socket 16, the shaft 50 extends downwardly through a bore drilled therethrough by a user prior to use. A free end of the shaft 50 includes a spherical tip 54 that frictionally slides up a trailer hitch ball when contact is made therebetween during a hitching operation. Alternatively, the free end of the shaft 50 may include a pair of wheels 56 axially coupled to the free end with a pin 58 (FIGS. 5 and 6). The wheels 56 enhance smooth movement of the shaft 50 upon a trailer hitch ball 14.

In use, the first guide member 22 may be mounted to a towing vehicle 10 by positioning the magnetic first base 24 on a bumper 12 or other metal surface near the trailer hitch ball 14. The first guide rod 26 is then extended such that the first guide ball 28 is visible from the driver's seat of the towing vehicle 10. The first guide rod may also be laterally and longitudinally positioned according to the first 30 and second 32 clevis couplings such that the first guide ball 28 is directly above the trailer hitch ball 14. The second guide member 34 may be mounted to a trailer by positioning the magnetic second base 36 about the trailer hitch socket 16 thereof. The second guide rod 42 may then be extended so as to be visible from the driver's seat of the towing vehicle 10. Viewing the extended first 26 and second 42 guide rods enables the driver to maintain the ball 14 and socket 16 in proper lateral alignment as the vehicle is reversed toward the trailer.

Figure 7:
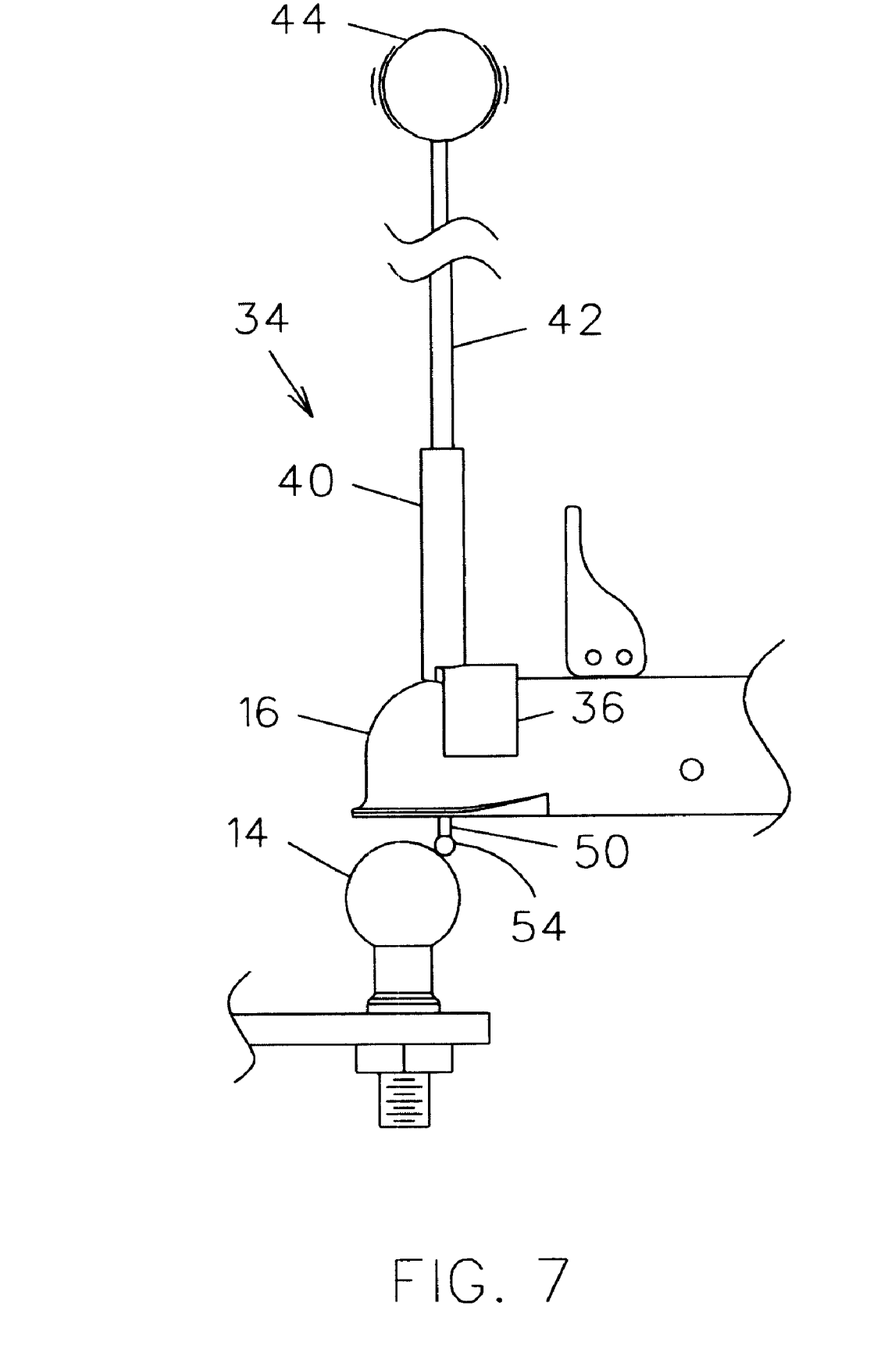
FIG. 7 is a side view of the apparatus as in FIG. 1 in a partially longitudinally aligned configuration.
Figure 8:
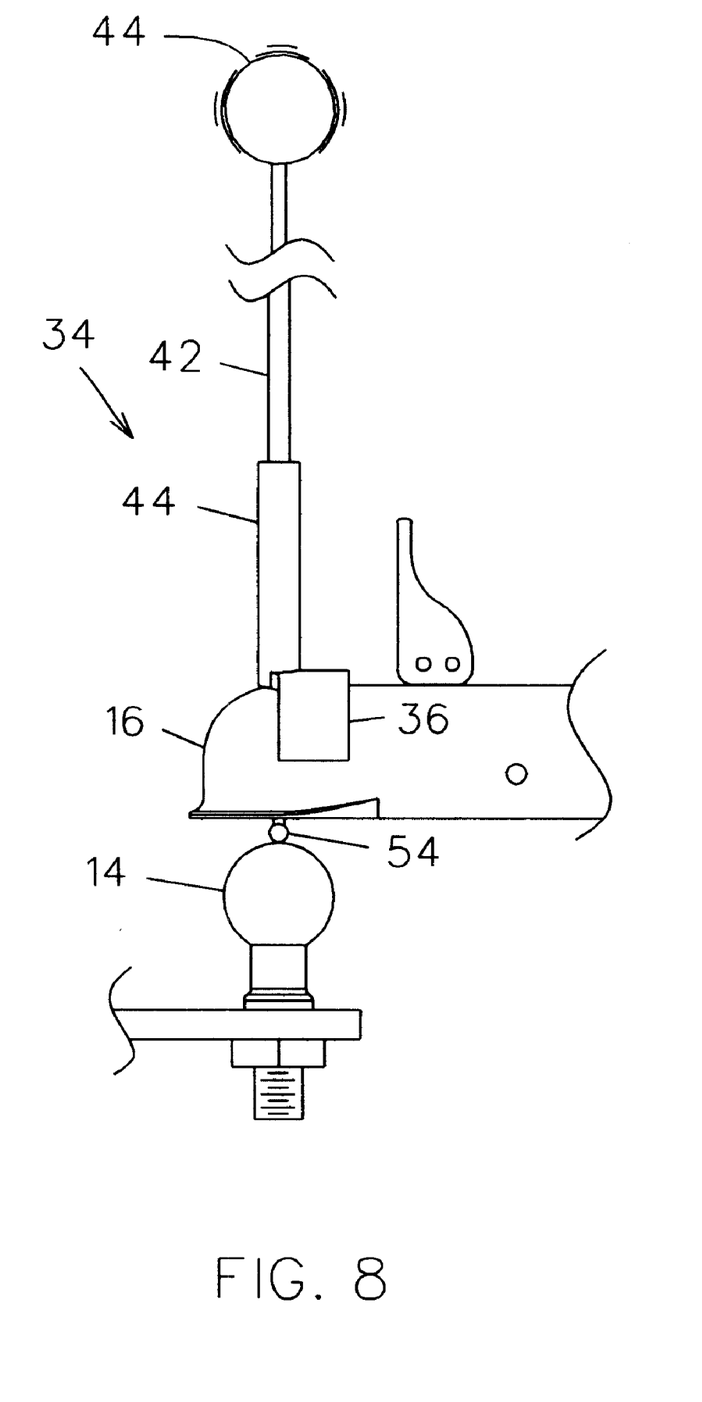
FIG. 8 is a side view of the apparatus as in FIG. 1 in a completely longitudinally aligned configuration.

The shaft 50 of the second guide member 34 extends downwardly through the bore of the socket 16. It should be appreciated that this bore allows the shaft 50 to be positioned along an imaginary longitudinal axis corresponding to the exact center of the socket 16. When the trailer hitch ball 14 contacts the tip 54 of the shaft 50 as the towing vehicle is reversed, the semi-flexible shaft 50 bends slightly and then gradually slides up the ball 14. As the shaft 50 is forced upward by this contact, the shaft 50 as well as the second guide rod 42 are vertically displaced through the housing 40 and relative to the second base 36 (FIG. 7). Upward movement of the second guide rod 42 biases the compression spring 46. When the second guide rod 42 (and therefore the second guide ball) are moved to their maximum vertical displacement, the driver may stop backing as this indicates that perfect longitudinal alignment has been achieved (FIG. 8). Any further movement of the towing vehicle results in the spring 46 returning to its unbiased state which moves the second guide rod 42 in a downward direction.

Figure 9:
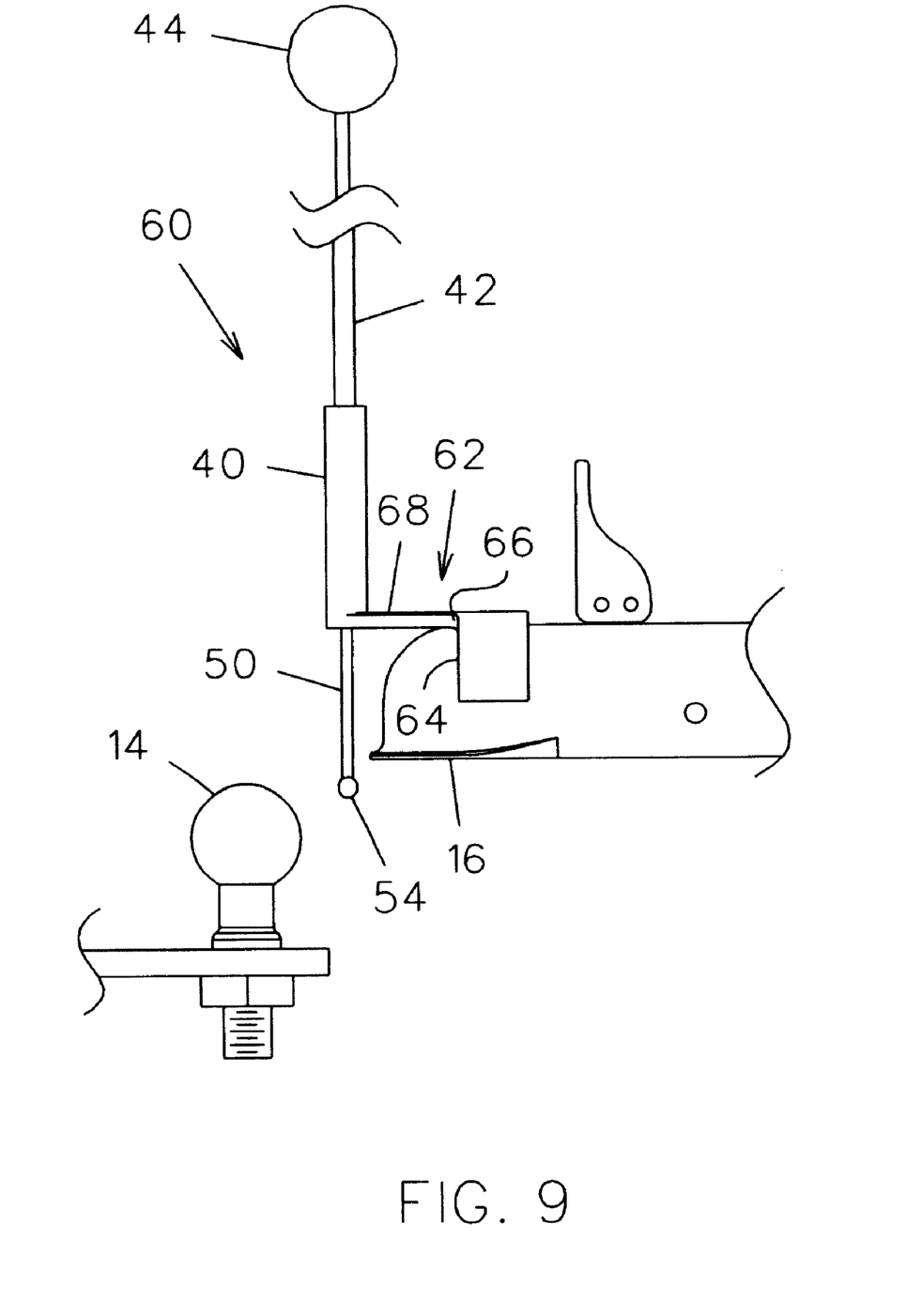
FIG. 9 is a fragmentary side view of another embodiment of the alignment apparatus according to the present invention.

Another embodiment of the second guide member 60 according to the present invention is substantially similar to the embodiment described previously except as specifically noted below. In this embodiment, the second guide member 34 includes an offset arm 62 having one end 66 fixedly attached to a forward longitudinal edge 64 of the second base and extending to a point forward of the trailer hitch socket 16. The other (forward) end 68 of the offset arm 62 is fixedly attached to the lower end of the tubular housing 40. In this embodiment, a bore need not be drilled in the trailer hitch socket 16 as the shaft 50 extends downwardly in front of the socket 16. It should be understood that in this embodiment, maximum vertical displacement of the shaft 50, second guide rod 42, and second guide ball 44 indicates substantial longitudinal alignment of the ball 14 and socket 16 and that the driver need only continue backing about one more inch, at most.

Accordingly, it can be seen that the alignment apparatus according to the present invention provides primary and secondary indicators to assist the driver of a tow vehicle in laterally and longitudinally aligning a trailer hitch ball and socket.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A trailer hitch alignment apparatus for use in assisting the driver of a towing vehicle to align a trailer hitch ball carried by said towing vehicle with a trailer hitch socket defining a bore therethrough and carried by a trailer, said alignment apparatus comprising:

a first guide member having a first base removably coupled to a bumper of said towing vehicle;

a first guide rod coupled to said first base for viewing from a driver's seat of said towing vehicle, said first guide rod being telescopically extensible and extending upwardly from said first base;

a second guide member having a second base removably coupled to said trailer hitch socket;

a second guide rod coupled to said second base for viewing from a driver's seat of said towing vehicle, said second guide rod having a first telescopically extensible segment extending upwardly from said second base and a second segment extending downwardly through said trailer hitch socket bore, said second guide rod being slidably vertically movable relative to said trailer hitch socket bore and said second base when said second segment contacts said trailer hitch ball.

2. The alignment apparatus as in claim 1 wherein said first base includes a circular configuration magnetically coupled to said bumper; and wherein said second base includes a C-shaped configuration magnetically coupled to said trailer hitch socket.

3. The alignment apparatus as in claim 1 further comprising a first ball fixedly attached to an upper end of said first guide rod and a second ball fixedly attached to an upper end of said first segment of said second guide rod, said second ball having a diameter greater than a diameter of said first ball so as to enhance visual perception of a vertical movement of said second guide rod upon alignment of said trailer hitch ball with said trailer hitch socket.

4. The alignment apparatus as in claim 1 further comprising a pair of rollers axially coupled to a free end of said second segment of said second guide rod for smooth movement of said second segment up and over said trailer hitch ball upon contact therewith during an alignment operation.

5. The alignment apparatus as in claim 1 wherein said first guide member includes:

a first clevis fixedly attached to said first base;

a second clevis axially coupled to said first clevis for lateral movement of said second clevis relative to said first base; and a lower end of said first guide rod being axially coupled to said second clevis for forward or rearward movement of said first guide rod relative to said first base.

6. The alignment apparatus as in claim 1 wherein said second segment of said second guide rod is constructed of a semi-flexible material.

7. A trailer hitch alignment apparatus for use in assisting the driver of a towing vehicle to align a trailer hitch ball carried by said towing vehicle with a trailer hitch socket that defines a bore therethrough and that is carried by a trailer, said alignment apparatus comprising:

a first guide member comprising:
a first base having a circular configuration adapted to magnetically adhere to a bumper of said towing vehicle;
a first guide rod coupled to said first base and being telescopically extensible for viewing from a driver's seat of said towing vehicle;

a second guide member comprising:
a second base having a C-shaped configuration adapted to magnetically adhere to said trailer hitch socket;
a tubular housing mounted to a lateral edge of said second base and defining a substantially open top and bottom;
a second guide rod slidably mounted within said housing and telescopically extensible through said open top for viewing from a driver's seat of said towing vehicle;
a shaft depending from a lower end of said second guide rod and adapted to extend downwardly through said open bottom of said housing and through said trailer hitch socket bore so as to contact said trailer hitch ball when said ball and socket are aligned, said shaft and said second guide rod adapted to move vertically through said housing when said shaft contacts said trailer hitch ball.

8. The alignment apparatus as in claim 7 further comprising a first ball fixedly attached to an upper end of said first guide rod and a second ball fixedly attached to an upper end of said second guide rod, said second ball having a diameter greater than a diameter of said first ball so as to enhance visual perception of a vertical movement of said second guide rod upon alignment of said trailer hitch ball with said trailer hitch socket.

9. The alignment apparatus as in claim 7 further comprising a compression spring disposed in said housing of said second guide member, said spring being coupled to said second guide rod and movable between a first unbiased configuration when said shaft and said second guide rod are not upwardly displaced and a second biased configuration when said shaft and said second guide rod are upwardly displaced upon contact between said shaft with said trailer hitch ball.

10. The alignment apparatus as in claim 7 further comprising a pair of rollers axially coupled to a free end of said shaft for smooth movement of said shaft up and over said trailer hitch ball upon contact therewith during an alignment operation.

11. The alignment apparatus as in claim 7 wherein a free end of said shaft includes a spherical tip for smooth movement of said shaft up and over said trailer hitch ball upon contact therewith during an alignment operation.

12. The alignment apparatus as in claim 7 wherein said first guide member includes:

a first clevis fixedly attached to said first base;

a second clevis axially coupled to said first clevis for lateral movement of said second clevis relative to said first base; and a lower end of said first guide rod being axially coupled to said second clevis for forward or rearward movement of said first guide rod relative to said first base.

13. The alignment apparatus as in claim 7 wherein said shaft is semi-flexible.

14. A trailer hitch alignment apparatus for use in assisting the driver of a towing vehicle to align a trailer hitch ball carried by said towing vehicle with a trailer hitch socket carried by a trailer, said alignment apparatus comprising:

a first guide member comprising:
a first base having a circular configuration adapted to magnetically adhere to a bumper of said towing vehicle;
a first guide rod coupled to said first base and being telescopically extensible for viewing from a driver's seat of said towing vehicle;

a second guide member comprising:
a second base having a C-shaped configuration adapted to magnetically adhere to said trailer hitch socket;
an offset arm having one end fixedly attached to said second base, said offset arm extending forward of said trailer hitch socket;
a tubular housing mounted to the other end of said offset arm and defining a substantially open top and bottom;
a second guide rod slidably mounted within said housing and telescopically extensible through said open top for viewing from a driver's seat of said towing vehicle;
a shaft depending from a lower end of said second guide rod and adapted to extend downwardly through said open bottom of said housing so as to contact said trailer hitch ball when said ball and socket are substantially aligned and to move up and over said ball when said ball and socket are completely aligned, said shaft and said second guide rod adapted to move vertically through said housing when said shaft contacts said trailer hitch ball.

15. The alignment apparatus as in claim 14 further comprising a first ball fixedly attached to an upper end of said first guide rod and a second ball fixedly attached to an upper end of said second guide rod, said second ball having a diameter greater than a diameter of said first ball so as to enhance visual perception of a vertical movement of said second guide rod upon alignment of said trailer hitch ball with said trailer hitch socket.

16. The alignment apparatus as in claim 14 further comprising a compression spring disposed in said housing of said second guide member and coupled to said second guide rod, said spring being movable between a first unbiased configuration when said shaft and said second guide rod are not upwardly displaced and a second biased configuration when said shaft and said second guide rod are upwardly displaced upon contact between said shaft with said trailer hitch ball.

17. The alignment apparatus as in claim 14 wherein said first guide member includes:
- a first clevis fixedly attached to said first base;
- a second clevis axially coupled to said first clevis for selective lateral movement of said second clevis relative to said first base; and
- a lower end of said first guide rod being axially coupled to said second clevis for selective forward or rearward movement of said first guide rod relative to said first base.

* * * * *